United States Patent
Dresser et al.

(10) Patent No.: US 7,444,014 B2
(45) Date of Patent: Oct. 28, 2008

(54) EXTENDED DEPTH OF FOCUS MICROSCOPY

(75) Inventors: Michael E. Dresser, Edmond, OK (US); Jose-Angel Conchello, Oklahoma City, OK (US)

(73) Assignee: Oklahoma Medical Research Foundation, Oklahoma City, OK (US)

( * ) Notice: Subject to any disclaimer, the term of this patent is extended or adjusted under 35 U.S.C. 154(b) by 771 days.

(21) Appl. No.: 10/779,319

(22) Filed: Feb. 13, 2004

(65) Prior Publication Data

US 2004/0228520 A1 Nov. 18, 2004

Related U.S. Application Data

(60) Provisional application No. 60/448,653, filed on Feb. 18, 2003.

(51) Int. Cl.
*G06K 9/00* (2006.01)

(52) U.S. Cl. .................. 382/154; 382/255; 359/306; 359/579

(58) Field of Classification Search .......... 382/154, 382/173, 190, 255, 254, 260, 264, 263, 274, 382/275; 250/201.8, 204, 208.1, 201.2, 223 R, 250/227.24, 566, 226; 396/114, 101, 111, 396/128, 104, 107; 359/350, 839, 306, 579; 358/474, 119; 348/350, E5.045, E13.007, 348/E13.009, E13.014, E13.016, E13.024, 348/E13.025

See application file for complete search history.

(56) References Cited

U.S. PATENT DOCUMENTS

| | | | |
|---|---|---|---|
| 5,047,968 A | 9/1991 | Carrington et al. .......... 364/574 |
| 5,193,124 A * | 3/1993 | Subbarao ................. 382/255 |
| 5,671,085 A | 9/1997 | Gustafsson et al. ......... 359/385 |
| 5,737,456 A * | 4/1998 | Carrington et al. .......... 382/299 |
| 5,778,038 A * | 7/1998 | Brandt et al. ............... 378/4 |
| 5,790,692 A * | 8/1998 | Price et al. ............... 382/133 |
| 6,525,302 B2 * | 2/2003 | Dowski et al. .......... 250/201.2 |
| 6,608,682 B2 * | 8/2003 | Ortyn et al. .............. 356/419 |
| 6,671,044 B2 * | 12/2003 | Ortyn et al. .............. 356/326 |

OTHER PUBLICATIONS

Hausler, "A method toincrease the depth of focus by two step imag processing," *Optics Communications*, 6(1):38-42. 1972.

Hausler and Korner, "Imaging with expanded depth of focus," *Zeiss Information*, 29:9-13, 1987.

Holmes et al., "Increased depth of field and stereo pairs of fluorescence micrographs via inverse filtering and maximum-likelihood estimation," *Journal of Microscopy*, 164(Part 3):217-237, 1991.

"Computatinoal optical sectioning microscopy of live cardiomyocytes," Computational Optical Sectioning Microscopy, htt;://216.239.57.1.../fmnotes.html+deconvolution+otf+psf+introduction&hl=en&ie=UTF, printed Jan. 8, 2003.

(Continued)

*Primary Examiner*—Sheela C Chawan
(74) *Attorney, Agent, or Firm*—Fulbright & Jaworski L.L.P.

(57) ABSTRACT

Imaging techniques. The focus of an imaging device is varied while acquiring an image of an object. The resulting blurred image is deconvolved to generate, in one embodiment, a two-dimensional projection image of three dimensions of the object.

6 Claims, 5 Drawing Sheets

OTHER PUBLICATIONS

Agard, "Optical sectioning microscopy", *Ann. Rev. Biophys. Bioeng*, 13:191-219, 1984.

Carrington et al., "Superresolution three-dimensional images of fluorescence in cells with minimal light exposure," *Science*, 268:1483-1487, 1995.

Carrington, "Image restoration in 3D microscopy with limited data" in SPIE vol. 1205 *Bioimaging and two-dimensional spectroscopy* L. C. Smith, editor SPIE press., 72-83, 1990.

Christou, "Deconvolution algorithms," *Center for Adaptive Optics*.

Conchello and Yu, "Parametric blind deconvolution of fluorescence microscope images: Preliminary results," in *Three-Dimensional microscopy: image acquisition and processing* C. J. Cogswell, G. S. Kino, and T. Wilson, editors, Proceedings of the SPIE 2655, 164-174, 1996.

Conchello and McNally "Fast regularization technique for expectation maximization algorithm for computational optical sectioning microscopy," in *Three-Dimensional microscopy: image acquisition and processing III*, C. J. Cogswell, G. Kino, and T. Wislon, editors. Proc. SPIE 2655-199-208, 1996.

Conchello and McNally, "Subpixel resolution in maximum likelihood image restoration" in *Three-Dimensional microscopy: image acquisition and processing IV*, C. J. Cogswell, J. A. Concehllo, and T. Wislon, editors. Proc. SPIE 2984-158-168, 1997.

Conchello, et al., "Enhanced 3-D Reconstruction from Confocal Scanning Microscope Images. II: Depth Discrimination vs. Signal-to-Noise Ratio in Partially Confocal Images," *Appl. Opt.-Information Processing*, 33(17):3740-3750, 1994.

Conchello, "Super-resolution and convergence properties of the expectation maximization algorithm for maximum-likelihood deconvolution of incoherent images," *Journal of the Optical Society of America-A*, 15(10):2609-2619, 1998.

Conchello, and Hansen "Enhanced 3-D reconstruction from confocal scanning microscope images. I: Deterministic and maximum likelihoodreconstructions," *Applied Optics*, 29(26):3795-3804, 1990.

Fay et al., "Three-dimensional Molecular Distribution in Single Cells Analyzed Using the Digital Imaging Microscope," *Journal of Microscopy*, 153:133-149, 1989.

Holmes "Expectation-maximization restoration of band limited, truncated point-process intensities with application in microscopy" J. Opt. Soc. Am.-A 6(7) pp. 1006-1014 (1989).

Holmes and Liu "Acceleration of maximum-likelihood image restoration for fluorescence microscopy and other noncoherent imagery," *J. Opt. Soc. Am.-A*, 8(6):893-907, 1991.

Holmes et al. "Light microscopic images reconstructed by maximum likelihood deconvolution" Chapter 24 in *Handbook of biological confocal microscopy*, 2nd edition, J. B. Pawley, editor, 389-402, 1995.

Holmes Liu "Richardson-Lucy/maximum likelihood image restoration algorithm for fluorescence microscopy: further testing" Appl. Opt. 28 (22) pp. 4930-4938 (1989).

Holmes, "Maximum-likelihood image restoration adapted for noncoherent optical imaging," *Journal of the Optical Society of America A*, 5(5):666-673, 1988.

Liu and Holmes, "2D and 3D fluorescence microscopy by maximum likelihood estimation: Micrograph results," *Microscopy Society of America Bulletin*, 23(2):189-198, 1993.

Loew et al., "Imaging in five dimensions: Time-dependent membrane potentials in individual mitochondria," *Biophysical Journal*, 65(12):2396-2407, 1993.

Malkusch et al., "Digital light microscopy: Prerequisite for optimum enhancement and increase of resolution," *Experimental Gerontology*, 36:1199-1217, 2001.

Markham and Conchello, "Fast maximum-likelihood image restoration algorithms for three-dimensional fluorescence microscopy," *Journal of the Optical Society of America-A.*, 18(5): 1062-1071, 2001.

Markham and Conchello, "Parametric blind deconvolution: a robust method for the simultaneous estimation of image and blur," J. Opt. Soc. Am. A., 16(10):2377-2391, 1999.

Markham and Conchello, "Tradeoffs in regularized maximum-likelihood image restoration," in Three-Dimensional Microscopy: Image Acquisitionand Processing IV. C Cogswell, J. A. Conchello, and T. Wilson Editors. Proc. SPIE 2984-18:136-145, 1997.

Rizzuto et al., "Digital imaging microscopy of living cells," Trends in Cell Biology, 8(7):288-292, 1998.

Schaefer et al., "Generalized approach for accelerated maximum likelihood based image restoration applied to three-dimensional fluorescence microscopy" *Journal of Microscopy*, 204(2):99-107, 2001.

van der Voort, "Theory and practice of 3D image restoration," *Scientific Volume Imaging B. V.*, 1-38, Hilversum, Netherlands.

van Kempen et al., "Application of image restoration algorithms for confocal fluorescence microscopy" in *Three-dimensional microscopy: Image acquisition and processing*, IV C. J. Cogswell, J.-A. Conchello, and T. Wilson, Editors Proc. SPIE 2984:114-124, 1997.

van Kempen et al., "Comparing maximum likelihood estimation and constrained Tikhonov-Miller restoration as applied to confocal microscopy," *IEEE Engineering in Medicine and Biology*, 76-83, 1996.

Verveer and Jovin "Acceleration of the ICTM image restoration algorithm" *Journal of Microscopy*, 188 (part 3):191-195, 1997.

Verveer and Jovin "Efficient superresolution restoration algorithms using maximum a posteriori estimations with applications to fluorescencemicroscopy" Journal *of the Optical Society of America-A*, 14(8):1696-1706, 1997.

Verveer and. Jovin "Image restoration based on Good's roughness penalty with application to fluorescence microscopy," *J. Opt. Soc. Am.-A*, 15(5):1077-1083, 1998.

Verveer and. Jovin "Improved restoration from multiple images of a single object: application to fluorescence microscopy," *Applied Optics*, 37(26): 6240-6246, 1998.

Verveer et al., "A comparison of image restoration approaches applied to three-dimensional confocal and wide-field fluorescence microscopy," *Journal of Microscopy*, 183 (1):60-61, 1999.

Verveer et al., "Superresolution MAP algorithms applied to fluorescence imaging," in *Three-dimensional microscopy: Image acquisition and processing* IV C. J. Cogswell, J.-A. Conchello, and T. Wislon, Editors, *Proc. SPIE*, 2984:125-135, 1997.

Verveer et al., "Theory of confocal fluorescence imaging in the programmable array microscope (PAM), " *Journal of Microscopy*, 189(3):192-198, 1998.

Häusler and Körner, "Imaging with expanded depth of focus," *Zeiss Inform.*, 29:9-13, 1986.

Häusler, "A method to increase the depth of focus by two step image procesing," *Optics Communications*, 6(1):38-42, 1972.

Holmes et al., "Increased depth of field and stereo pairs of fluorescence micrographs via inverse filtering and maximum-likelihood estimation," *Journal of Microscopy*, 164(pt 3):217-237, 1990.

\* cited by examiner

EXTENDED DEPTH OF FOCUS MICROSCOPY

This application claims priority to, and incorporates by reference, U.S. Provisional Patent Application Ser. No. 60/448,653, which was filed on Feb. 18, 2003.

BACKGROUND OF THE INVENTION

1. Field of the Invention

The present invention generally relates to multidimensional imaging. More particularly, the invention relates to three-dimensional (3D) microscopy obtained by varying focus during acquisition of an image followed by image deconvolution.

2. Background

The rate of acquisition of 3D imaging (e.g., acquisition of fluorescent signals in 3D) using digital imaging-based microscopy is a critical factor in a number of applications. Because the depth of focus is relatively shallow and becomes shallower as the resolving power of the objective lens increases (as the numerical aperture increases), it is often necessary to acquire image samples at multiple levels of focus in the object of interest in order to avoid missing potentially important sources of signal. In applications requiring large sample sizes, the rate of acquisition sets an upper limit on the possible throughput. In applications where the object of interest moves during acquisition, this rate correlates directly with the amount of motion blur in the acquired images.

Current practice is to acquire individual image "slices" at discrete sampling planes by moving focus between each acquisition, then conceptually to combine these slices into image stacks ("volumes") which are processed further as needed. This procedure introduces several bottle-necks: (1) quickly changing focus introduces vibrations in the sample that degrade the image, and waiting for the vibrations to dampen or slowly moving focus slows the process, (2) images must be collected, digitized, and transmitted individually—each step introducing delays, and (3) processing of the 3D data sets to remove out-of-focus blur is computationally burdensome. What is needed is a set of techniques that would allow for rapid and reliable 3D acquisition of data.

The referenced shortcomings are not intended to be exhaustive, but rather are among many that tend to impair the effectiveness of previously known imaging techniques; however, those mentioned here are sufficient to demonstrate that methodology appearing in the art have not been altogether satisfactory and that a significant need exists for the techniques described and claimed in this disclosure.

SUMMARY OF THE INVENTION

Particular shortcomings of the prior art are reduced or eliminated by the techniques discussed in this disclosure.

In one respect, the invention involves an imaging method. An imaging device is displaced in one dimension while acquiring an image of an object, thereby blurring the image. The blurred image is deconvolved to generate a multidimensional representation of the object.

In another respect, the invention involves an imaging method. The focus of an imaging device is varied while acquiring an image of an object, thereby blurring the image. The blurred image is deconvolved to generate a representation of the object.

In another respect, the invention involves an imaging method. A shutter of an imaging device is opened to begin acquisition of an acquired image of an object. The focus of the imaging device is varied while the shutter is open, thereby blurring the acquired image. A point spread function (PSF) associated with the imaging device is determined. An optical transfer function (OTF) is determined using the PSF. An object estimate is determined. The object estimate is convolved with the PSF, using the OTF, to generate an estimated image. The estimated image is compared with the acquired image to obtain a ratio. The ratio is convolved with a mirror image of the PSF, using a complex conjugate of the OTF, to form a convolved ratio. The object estimate is multiplied with the convolved ratio to form an updated object estimate, and steps are repeated one or more times to generate a two dimensional projection image of three dimensions of the object from the updated object estimate.

In another respect, the invention involves an imaging system. An imaging device is configured to vary its focus while acquiring an image of an object, and a processor in operative relation with the imaging device is configured to execute machine-readable instructions for deconvolving a resulting blurred image to generate a representation of the object.

In another respect, the invention involves a retrofit kit for converting an imaging system. The kit includes means for allowing an imaging device to vary its focus while acquiring an image of an object and means for deconvolving a blurred image to generate a two dimensional projection image of three dimensions of the object.

Other features and associated advantages will become apparent with reference to the following detailed description of specific embodiments in connection with the accompanying drawings.

BRIEF DESCRIPTION OF THE DRAWINGS

The techniques of this disclosure may be better understood by reference to one or more of these drawings in combination with the detailed description of illustrative embodiments presented herein. Drawings are not to-scale.

DESCRIPTION OF ILLUSTRATIVE EMBODIMENTS

Techniques of this disclosure aim to address or eliminate shortcomings in 3D imaging, such as those mentioned above. The techniques allow one to achieve finer sampling along the direction of focus and increased speed of acquisition, albeit at the expense of information concerning signal position in the third dimension (along the direction of focus). In a generalized embodiment, two main steps are utilized:

(1) acquiring a two-dimensional (2D) image while changing focus, thus accumulating signal over the third dimension, and (2) then performing a 2D deconvolution using a point source image acquired either in the same manner or by numerical computation using an appropriate mathematical model.

These steps, among other things, increase the rate of acquisition of signal originating throughout the sample of interest.

Figure 1:
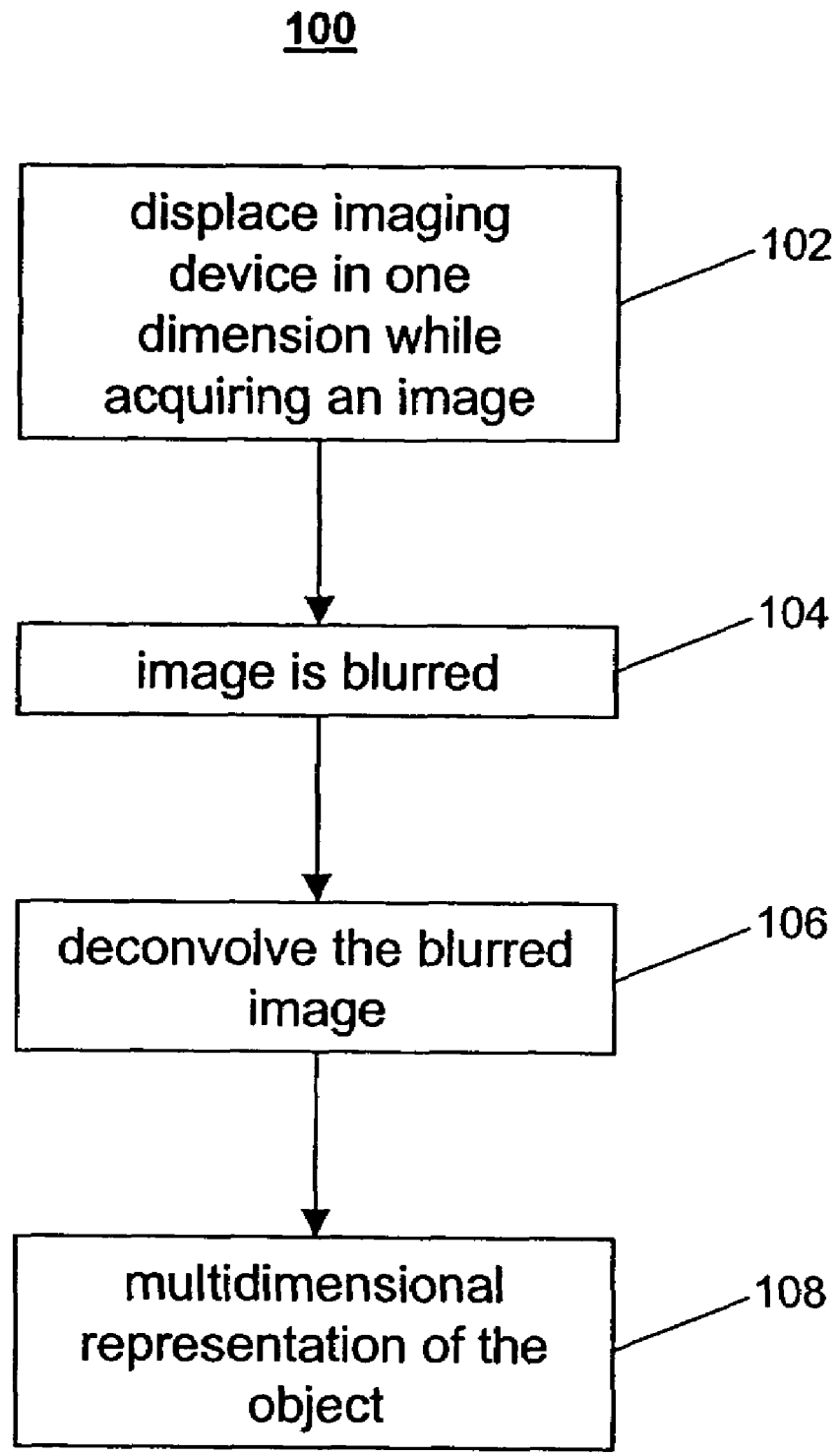
FIG. 1 is a flowchart showing an imaging method in accordance with embodiments of this disclosure.

FIG. 1 is a flowchart of a suitable method 100 for carrying out embodiments of this invention. In step 102, one displaces an imaging device (or, equivalently, a sample under study relative to the imaging device) in one dimension while acquiring an image. For example, one may displace a microscope in the x or y direction while imaging. Such displacement may be achieved through the use of an electrically or mechanically controlled stage or the like. In one embodiment, a stage controlled by piezoelectric components may be used. Those components may undergo programmed movements by controlling input voltages and other parameters as is known in the art. In another embodiment, an objective of the imaging device may be moved with piezoelectric components.

One may also displace the microscope in the z direction by changing focus. Specifically, the distance between imaging optics and the sample under study may be increased and/or decreased while image collection is taking place. In one embodiment, the focusing mechanism (e.g., an objective or a stage) may be controlled by piezoelectric components. Those components may undergo programmed movements by controlling input voltages and other parameters as is known in the art.

Due to the displacement during image acquisition, the resulting image will necessarily contain information about a range of locations along the axis of movement. For instance, if the imaging device is moved in the x direction, the resulting image will contain information about a range of locations of the sample along that direction. If focus is changed during image acquisition, one obtains depth information about the sample (i.e., at different levels of focus, a different depth of the sample is "in-focus" and hence being probed).

Also due to this displacement, the resulting image will be significantly blurred in the direction of movement. In addition, when thick specimens are imaged, the out of focus structures of the specimen are in the field of view and thus reduce contrast and resolution. Step 104 illustrates the fact that the image is blurred.

Embodiments of this invention recover the wealth of information present along the direction of displacement by analyzing and "removing" this blur. Step 106 represents this concept. In step 106, the blurred image is deconvolved, or deblurred, using mathematical techniques discussed in detail below.

The reconstruction of the blurred image in step 106 results in a deblurred image of the object. The image is a multidimensional representation of the object under study, illustrated in step 108. By "multidimensional representation" of the object, it is simply meant that the final image also contains information about the object along the dimension of motion. In the case where focus is varied during image acquisition (the z direction is the direction of motion), the techniques of this disclosure may be used to create a 2D projection image of a 3D region of the sample under study. The 2D projection image is a "multidimensional representation" since it contains information about a third dimension—depth of the sample. Likewise, using the techniques described above, one may generate a one dimensional (1D) projection image of a 2D area. The 1D projection image is therefore a multidimensional representation.

Figure 2:
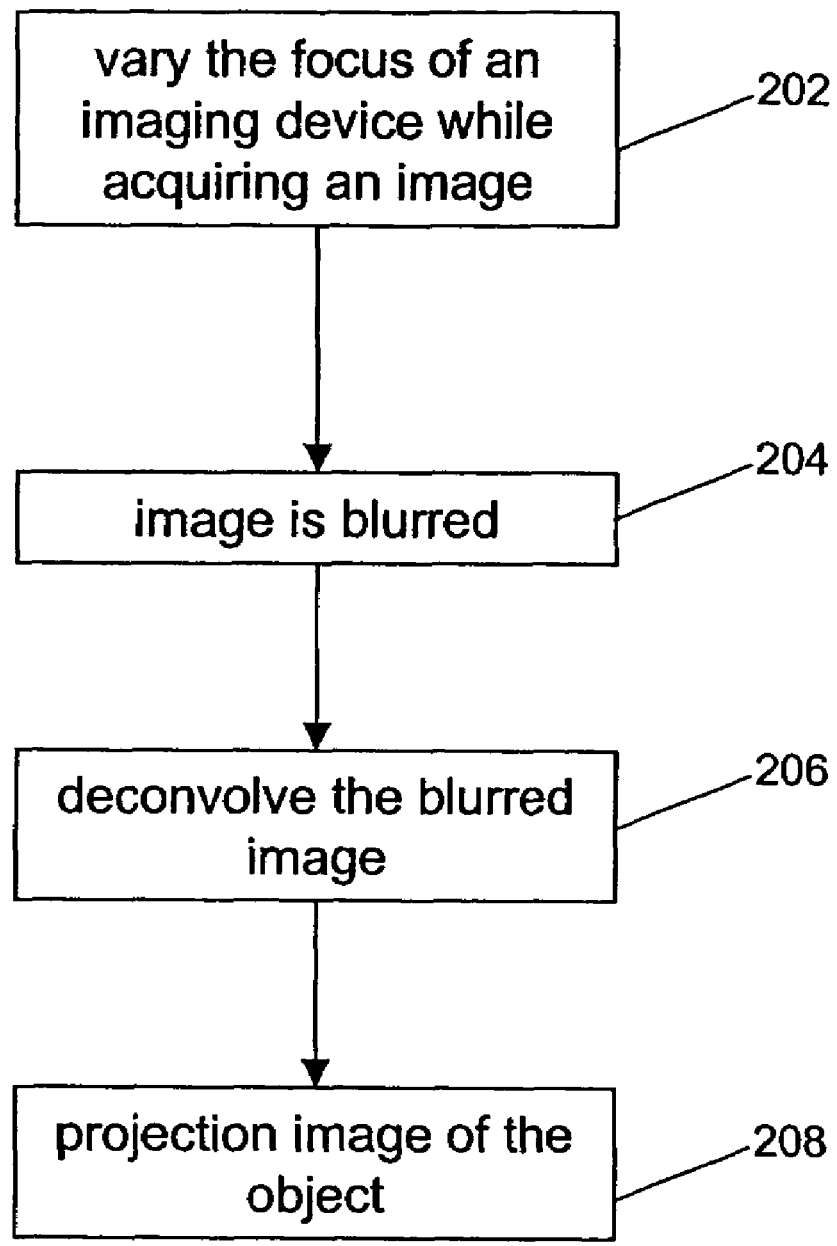
FIG. 2 is another flowchart showing an imaging method in accordance with embodiments of this disclosure.

FIG. 2 is a flowchart of another method 200 for carrying out preferred embodiments of this invention. FIG. 2 is similar to FIG. 1, but FIG. 2 specifies that the focus (z direction) of the imaging device is being displaced. In step 202, the focus is varied during image acquisition. In step 204, the blurred image results. In step 206, the blurred image is deconvolved, reconstructing information along the depth of the sample from the blur. In step 208, the multidimensional representation results—in one embodiment, a 2D projection image of a 3D region of the sample.

In FIGS. 1 and 2, the imaging device may be any one or combination of imaging devices known in the art suitable for generating digital images (or analog images that can be converted to digital information). In preferred embodiments, the imaging device may be a fluorescence microscope.

In FIGS. 1 and 2, obtaining an image while the imaging device is undergoing movement may be achieved in one of several ways. In preferred embodiments, a shutter of the imaging device remains open while the displacement takes place. Traditional fluorescence microscopy imaging devices specifically preclude the shutter from staying open while focus is changed. This functionality, however, may be overridden by modifying software, firmware, or other operating parameters of the device to turn off such blur-prevention mechanisms.

In FIGS. 1 and 2, the blurred image may be acquired in more than one stage. For instance, a first range of z movement may take place, the data may be saved or off-loaded, and then a second range of z movement may take place. Accordingly, one may avoid the situation in which the displacement overloads or saturates buffers, electronics, or other components of the system. Rather, the displacements may be broken up into a number of smaller, more manageable increments as needed.

Figure 3:
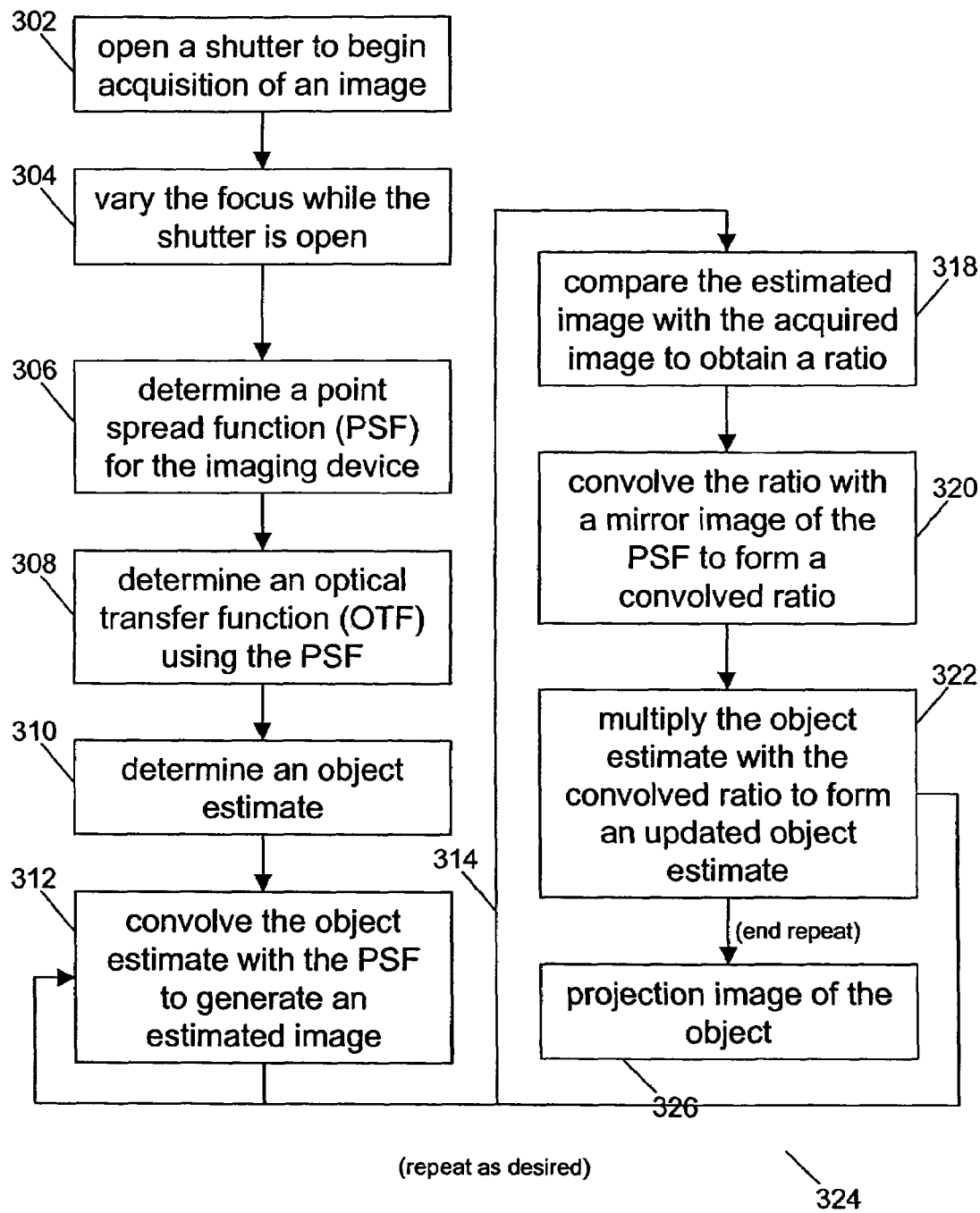
FIG. 3 is another flowchart showing an imaging method in accordance with embodiments of this disclosure.

FIG. 3 adopts the general techniques described with respect to FIGS. 1 and 2 while illustrating more specific, preferred embodiments. In step 302 of method 300, a shutter of an imaging device (e.g., a fluorescence microscope) is left open during image acquisition. In step 304, the focus is varied (e.g., with a piezoelectric controlled focusing mechanism or a motorized stand) to obtain imaging signal along the depth of the imaged object.

In steps 306-322, preferred embodiments for deconvolving the resulting blurred image are illustrated. As will be understood by one having ordinary skill in the art, with the benefit of this disclosure, many other deconvolution algorithms known in the art may be used.

In step 302, a shutter of an imaging device is open to begin acquisition of an image of an object. In step 304, focus is varied while that shutter is open, allowing for the acquisition of information about the object in the direction of focus without having to take multiple, distinct slice images. It is understood that changing the focus may begin before, at, or after the moment the shutter is open. In step 306, a point spread function (PSF) for the imaging device is determined, using any one of several methods known in the art. In step 308, an optical transfer function (OTF) may be determined using the PSF, using any one of several methods known in the art.

In step 310, an initial object estimate is determined. This may be represented as $\hat{s}^{(0)}$. In step 312, the object estimate is convolved with the point spread function (PSF =image of a point source) to obtain an estimated image:

$$\hat{g}^{(k)}(x_i) = \int_O h(x_i - x_o)\hat{s}^{(k)}(x_o)\,dx_o$$

where O is the object space, i.e. the set of pixel locations that comprise the specimen and its surroundings when projected along the z axis.

In step 318, the estimated image is compared to the recorded image in the form of a ratio:

$$d^{(k)}(x_i) = \frac{g(x_i)}{\hat{g}^{(k)}(x_i)},$$

where $g(x_i)$ is the recorded image, i.e. the detected intensity at a point $x_i=(x_i,y_i)$ in the detector.

In step 320, the ratio is convolved with the mirror image of the PSF to obtain a convolved ratio:

$$\hat{r}^{(k)}(x_o) = \int_I h(x_i - x_o) \hat{d}^{(k)}(x_i) dx_i$$

where I is the image space, i.e. the set of pixel locations that make the image.

In step 322, the object estimate is multiplied with the convolved ratio and divided by the integral of the PSF to form an updated object estimate:

where $$\hat{s}^{(k+1)}(x_o) = \frac{\hat{s}^{(k)}(x_o)}{H_0} \times \hat{r}^{(k)}(x_o)$$

where:

$$H_0 = \int_O h(x_o) dx_o$$

Figure 4:
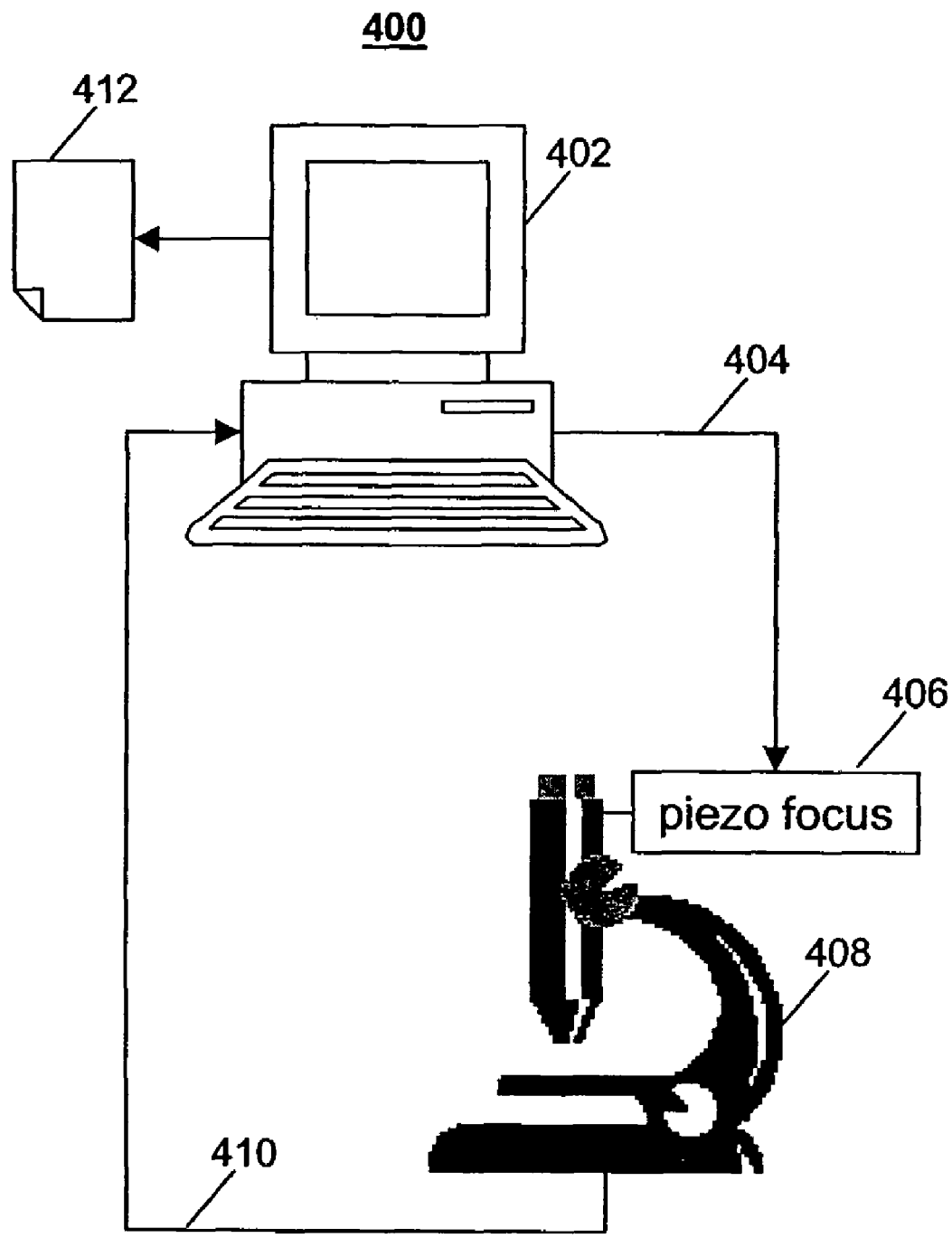
FIG. 4 is a schematic diagram showing an imaging system in accordance with embodiments of this disclosure.

FIG. 4 is a schematic diagram of an imaging system 400 in accordance with embodiments of the present disclosure. Included in the system are imaging device 408 controlled by piezoelectric focusing mechanism 406 and computer 402 that includes one or more processors, memory storage, and other peripherals as needed. Computer 402 may be coupled to imaging device 408 via piezoelectric focusing mechanism 406 (as shown), or it may coupled to another portion of the imaging device, e.g. a motorized stand. The coupling 404 may be via direct wire connection, network(s), or by any other way suitable to allow the communication of signals. As will be recognized by those having ordinary skill in the art, coupling 410 and 404 may constitute a single connection.

In preferred embodiments, a processor in computer 402 is configured to execute instructions for deconvolving blurred images to generate a multidimensional representation of the object. Specifically, the processor in computer 402 may be programmed to implement steps 106, 206, and 306-322 of FIGS. 1, 2, and 3 respectively. The processor may be programmed via firmware, software, or "hard-coded" (i.e. an application-specific integrated circuit ("ASIC")). In preferred embodiments, the processor in computer 402, or a dedicated controller, may also be programmed to control the focusing mechanism 406. Further, the processor may be capable of displaying or outputting the final deblurred image, represented as element 412 in FIG. 4.

In preferred embodiments, imaging device 408 may be a fluorescence microscope incorporating a shutter that can remain open during focus changes. In preferred embodiments, a piezoelectric focusing mechanism 406 may be configured to be programmably controlled to undergo for instance, oscillatory movements that cause the imaging device to focus up and down during examination of an object, combined with circuitry to toggle the illumination and/or camera shutter appropriately. Alternatively, the focusing mechanism in a microscope stand may be controlled to change focus while acquiring the image. Any method for changing the focus at a stable velocity while acquiring an image (e.g., a fluorescence image) will provide an image appropriate for this approach.

Using the techniques of this disclosure, one may create a retrofit kit that will convert a conventional imaging device into one suitable for extended-depth-of-focus microscopy. In particular, a conventional imaging device may be modified to allow it to vary its focus during image acquisition. Further, one may add appropriate hardware, software, or firmware to allow for deconvolution of the acquired image to form, for example, a two-dimensional projection image of three-dimensions of the imaged object.

With the benefit of this disclosure, those having ordinary skill in the art will recognize that the techniques described herein provide for significant advantages. Whereas conventional techniques require a series of focused images to be individually processed and then appropriately combined to form a multidimensional representation, the techniques here allow one to acquire a single image while changing focus or, more generally, during translation along some direction. Such an image is necessarily blurred due to, for example, (1) diffraction, (2) aberrations, (3) the presence of out-of-focus material or any combination of (1), (2), and (3). Deconvolution of that one image provides the final image, greatly reducing acquisition time.

Commercial application of techniques of this disclosure are vast, as the techniques circumvent a major stumbling block—the relatively slow rate of throughput in the acquisition of data required to address numerous biological problems. The methods are reliable and efficacious, and may even be implemented on existing, commercially-available microscope systems. Specifically, one may simply supply integrated equipment and software required to add this capability to existing systems.

As used herein, "a" and "an" shall not be strictly interpreted as meaning "one" unless the context of the invention necessarily and absolutely requires such interpretation.

The following examples are included to demonstrate specific, non-limiting embodiments of this disclosure. It should be appreciated by those of skill in the art that the techniques disclosed in the examples that follow represent techniques discovered by the inventors to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Acquisition/Apparatus

Acquisition Method #1:

A single fluorescent digital image of a 3D microscopic specimen may be made by focusing through the specimen during the exposure. The shutter to the camera may remain open while the focus is actively being changed, which necessarily results in the final image containing considerable blur. In order to acquire the needed images, one may use a piezoelectric focusing mechanism purchased from Polytec PI (Tustin, Calif.). For example, one may use E-662 controller with the P-721.10 PIFOC objective positioner, purchased from Polytec PI. This focusing mechanism can be driven to change focus during exposure (a) by varying an input voltage or (b)

by launching an independently-controlled oscillatory movement of the focusing mechanism using the E-662 controller. The two approaches give the same result, but both are described below. Where required focus change distances during image acquisition may exceed the working distance of the piezoelectric mechanism, the motorized focusing mechanism embedded in the microscope stand may be employed.

(a) The input voltage may be supplied by a digital-to-analog computer board purchased from Measurement Computing (Middleboro, Mass.). For example, one may use the CIO-DAC02/16 board from Measurement Computing, Corp. This board may be controlled by software from the Universal Library purchased from Measurement Computing. This software provides control of an output voltage that can be used to drive focusing changes via the E-662 controller. Images may be collected using a digital camera purchased from Roper Scientific. For example, one may use a Quantix 57 camera purchased from Roper Scientific, which can be purchased via their reseller Nikon Instrument Group (Lewisville, Tex.). The camera can be controlled with software provided as part of a software developer's kit from Roper Scientific combined with voltage-controller software routines. For example, code written in C++ may be used to initiate a timed camera exposure while steadily changing the voltage to the objective positioner, thus driving the movement through focus while the acquisition is in progress.

(b) The piezoelectric focusing mechanism may be sent into a continual oscillatory, up/down movement mode by sending commands to the Polytec PI E-662 controller. These commands may be sent, and the camera may be controlled to make exposures of appropriate lengths of time (to allow one complete oscillation excursion through focus), using generic software aided by the software developer's kit provided by Roper Scientific. ASCII-based commands to initiate the positioner movements are sent by a serial port to the E-662 controller. Then, the camera is controlled via the Roper Scientific PVCAM API to acquire the image. This method allows more consistent control of the focus movements as correlated with working the camera but, again, the two approaches give similar or identical results. It should be noted that focusing mechanisms embedded in microscope stands can be similarly controlled by simple ASCII-based serial communications, again with similar or identical results.

Acquisition Method #2:

The digital image acquired as above may require such a lengthy accumulation that the camera chip may not be able to hold all the signal at once. In this condition, the image may be made in several parts or stages. For example, one may acquire the top and then the bottom half of the focus range and then combine the two into a single 2D image prior to the processing step.

EXAMPLE 2

Processing

The image acquired as outlined above is blurred—but in a manner that can be deblurred. Deblurring, also referred to as deconvolution, of fluorescence images acquired microscopically by computational methods may be used.

There are a number of approaches to deblurring, two major classes of approaches being those that require multiple iterations of deconvolution versus those that deblur in a single pass. Those that require multiple iterations provide a higher resolution image but require more time. If the image to be deblurred is two-dimensional (even though the acquisition is done in 3D), the multiple iteration algorithms are extremely rapid by comparison with current alternatives for 3D images. For this reason, a multiple iteration algorithm may be useful, and one suitable algorithm entails:

1. Calculate 3D point spread function (PSF) by standard means and sum along the Z axis. In one embodiment, one may use a "Gibson and Lanni" model, as disclosed in, for example, F. S. Gibson, and F. Lanni, "Experimental test of an analytical model of aberration in an oil-immersion objective lens used in three-dimensional light microscopy," J. Opt. Soc. Am. A, 8(11), pp. 1601-1613 (1991), which is incorporated herein by reference.
2. Obtain the optical transfer function (OTF) from the PSF.
3. Normalize the OTF to have a DC component equal to 1.
4. Initialize specimen estimate with acquired image from microscope.
5. Convolve the specimen estimate with the PSF (use OTF in Fourier space).
6. Compare result with acquired image by a ratio.
7. Convolve the ratio with the "mirror image" of the PSF (via complex conjugate of the OTF in Fourier space).
8. Multiply specimen estimate by result of convolution.
9. Repeat steps 5-8 a designated number of times.

The final image is the deblurred result, which in preferred embodiments is a 2D projection/summation of the 3D specimen fluorescence without out-of-focus blur.

There are both variations and alternatives to the algorithm described above, which is based on maximum-likelihood (ML) image estimation. Some of the variations include compensating for image pixels that are defective, for image pixels that are large compared to the desired resolution, and for fields of view that are smaller than the specimen. Those having ordinary skill in the art will recognize several other variations and alternatives, having the benefit of this disclosure.

EXAMPLE 3

Figure 5:
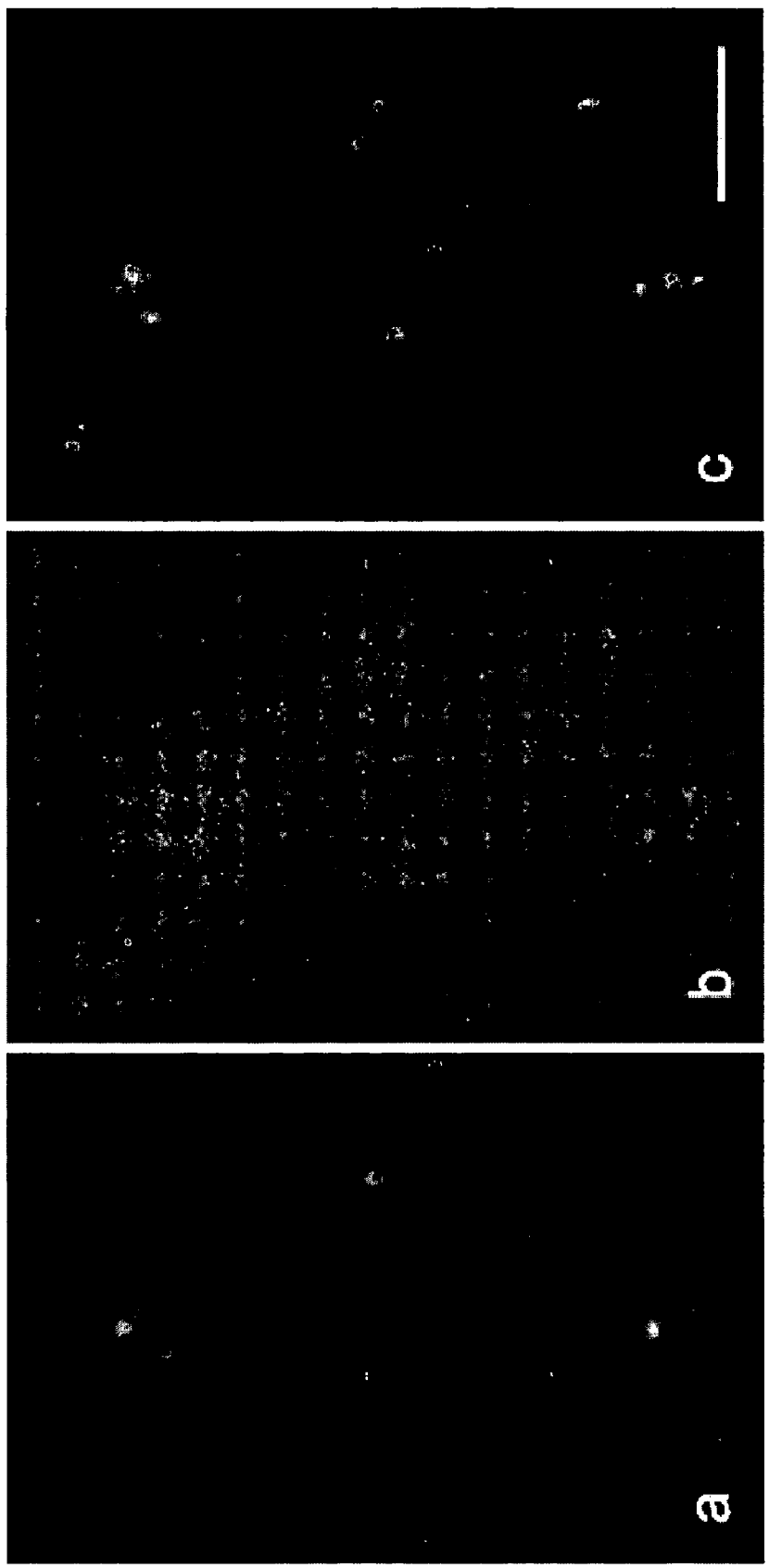
FIG. 5 shows seven live cells of S. cerevisiae, each of which has 1 to 3 moving fluorescent spots in its nucleus, which illustrates embodiments of this disclosure.

FIG. 5 shows seven live cells of S. cerevisiae, each of which has 1 to 3 moving fluorescent spots in its nucleus. The images in individual images labeled "a"-"c" were made at different times, so the spots are in slightly different locations in the nuclei from one image to the next. The image labeled "a" was made at a single plane of focus, where many of the spots are not evident. The image labeled "b" was made by moving through focus while collecting the image. The image labeled "c" was made as in "b" then deconvolved. The magnification bar represents 5 μm.

All the images of FIG. 5 were collected using a ZEISS AXIOPLAN 2ie with a 100×, 1.4NA objective and motorized stand and a ROPER QUANTIX 57 camera. Deconvolution was carried out using MATLAB to implement the algorithm outlined in FIG. 3, starting with a calculated PSF.

With the benefit of the present disclosure, those having skill in the art will comprehend that techniques claimed herein and described above may be modified and applied to a number of additional, different applications, achieving the same or a similar result. For example, one will recognize that moving an object is equivalent to varying focus (or any other displacement of the imaging device). The claims cover all modifications that fall within the scope and spirit of this disclosure.

We claim:

1. An imaging method comprising:
   (a) collecting an acquired image of an object using an imaging device;

(b) varying the focus of the imaging device while collecting the acquired image, thereby blurring the acquired image;
(c) determining a point spread function (PSF) associated with the imaging device;
(d) determining an optical transfer function (OTF) using the PSF;
(e) determining an object estimate;
(f) convolving the object estimate with the PSF, using the OTF, to generate an estimated image;
(g) comparing the estimated image with the acquired image to obtain a ratio;
(h) convolving the ratio with a mirror image of the PSF, using a complex conjugate of the OTF, to form a convolved ratio;
(i) multiplying the object estimate with the convolved ratio to form an updated object estimate; and
(j) repeating steps (f) through (i) one or more times to generate a two dimensional projection image of three dimensions of the object from the updated object estimate, and collecting the acquired image comprising opening a shutter of the imaging device.

2. The method of claim 1, varying the focus occurring while a shutter of the imaging device is open.

3. An imaging method comprising:
(a) collecting an acquired image of an object using an imaging device;
(b) varying the focus of the imaging device while collecting the acquired image, thereby blurring the acquired image;
(c) determining a point spread function (PSF) associated with the imaging device;
(d) determining an optical transfer function (OTF) using the PSF;
(e) determining an object estimate;
(f) convolving the object estimate with the PSF, using the OTF, to generate an estimated image;
(g) comparing the estimated image with the acquired image to obtain a ratio;
(h) convolving the ratio with a mirror image of the PSF, using a complex conjugate of the OTF, to form a convolved ratio;
(i) multiplying the object estimate with the convolved ratio to form an updated object estimate; and
(j) repeating steps (f) through (i) one or more times to generate a two dimensional projection image of three dimensions of the object from the updated object estimate, and varying the focus comprising varying an input voltage to a piezoelectric focusing mechanism of the imaging device.

4. An imaging method comprising:
(a) collecting an acquired image of an object using an imaging device;
(b) varying the focus of the imaging device while collecting the acquired image, thereby blurring the acquired image;
(c) detennining a point spread function (PSF) associated with the imaging device;
(d) determining an optical transfer function (OTF) using the PSF;
(e) determining an object estimate;
(f) convolving the object estimate with the PSF, using the OTF, to generate an estimated image;
(g) comparing the estimated image with the acquired image to obtain a ratio;
(h) convolving the ratio with a mirror image of the PSF, using a complex conjugate of the OTF, to form a convolved ratio;
(i) multiplying the object estimate with the convolved ratio to form an updated object estimate; and
(j) repeating steps (f) through (i) one or more times to generate a two dimensional projection image of three dimensions of the object from the updated object estimate, and varying the focus comprising applying signals to a piezoelectric focusing mechanism of the imaging device to generate oscillatory movement of the focusing mechanism.

5. An imaging method comprising:
(a) collecting an acquired image of an object using an imaging device;
(b) varying the focus of the imaging device while collecting the acquired image, thereby blurring the acquired image;
(c) determining a point spread function (PSF) associated with the imaging device;
(d) determining an optical transfer function (OTF) using the PSF;
(e) determining an object estimate;
(f) convolving the object estimate with the PSF, using the OTF, to generate an estimated image;
(g) comparing the estimated image with the acquired image to obtain a ratio;
(h) convolving the ratio with a mirror image of the PSF, using a complex conjugate of the OTF, to form a convolved ratio;
(i) multiplying the object estimate with the convolved ratio to form an updated object estimate; and
(j) repeating steps (f) through (i) one or more times to generate a two dimensional projection image of three dimensions of the object from the updated object estimate, and varying the focus comprising launching a velocity-controlled focus change using the a stand-based focusing mechanism.

6. An imaging method comprising:
(a) collecting an acquired image of an object using an imaging device;
(b) varying the focus of the imaging device while collecting the acquired image, thereby blurring the acquired image;
(c) determining a point spread function (PSF) associated with the imaging device;
(d) determining an optical transfer function (OTF) using the PSF;
(e) determining an object estimate;
(f) convolving the object estimate with the PSF, using the OTF, to generate an estimated image;
(g) comparing the estimated image with the acquired image to obtain a ratio;
(h) convolving the ratio with a mirror image of the PSF, using a complex conjugate of the OTF, to form a convolved ratio;
(i) multiplying the object estimate with the convolved ratio to form an updated object estimate; and
(j) repeating steps (f) through (i) one or more times to generate a two dimensional projection image of three dimensions of the object from the updated object estimate, and acquiring the image being accomplished in two or more stages.

* * * * *

UNITED STATES PATENT AND TRADEMARK OFFICE
CERTIFICATE OF CORRECTION

PATENT NO.         : 7,444,014 B2  Page 1 of 1
APPLICATION NO. : 10/779319
DATED              : October 28, 2008
INVENTOR(S)      : Michael E. Dresser et al.

It is certified that error appears in the above-identified patent and that said Letters Patent is hereby corrected as shown below:

In claim 4, column 9, line 57, delete "detennining" and insert --determining-- therefor.

Signed and Sealed this

Thirteenth Day of January, 2009

JON W. DUDAS
*Director of the United States Patent and Trademark Office*